United States Patent [19]

Maichel

[11] Patent Number: 5,611,365
[45] Date of Patent: Mar. 18, 1997

[54] VALVE INSERTION METHOD AND ASSEMBLY FOR INSERTING A VALVE IN A LINE

[76] Inventor: Jeffrey L. Maichel, International Flow Technologies, Inc., 30230 Los Alamos Rd., Murrieta, Calif. 92563

[21] Appl. No.: 603,884

[22] Filed: Feb. 22, 1996

[51] Int. Cl.⁶ .............................. F16K 43/00; F16K 3/02; F16K 3/30
[52] U.S. Cl. .................... 137/15; 30/96; 30/98; 82/113; 137/238; 137/318; 251/327; 251/328; 251/329
[58] Field of Search .................. 30/92, 94, 95, 30/96, 98; 82/78, 113; 83/745; 137/15, 238, 240, 315, 318; 251/326, 327, 328, 329

[56] References Cited

U.S. PATENT DOCUMENTS

| | | | |
|---|---|---|---|
| 587,108 | 7/1897 | Sherrerd | 30/98 |
| 1,989,768 | 2/1935 | Nieman | 137/318 |
| 2,763,282 | 9/1956 | Reedy et al. | 137/318 |
| 2,899,983 | 8/1959 | Farris | 137/318 |
| 2,964,290 | 12/1960 | Mueller | 137/318 |
| 2,983,477 | 5/1961 | Merrill | 137/318 |
| 3,091,260 | 5/1963 | Milanovits et al. | 138/94 |
| 3,227,011 | 1/1966 | Larry | 137/318 |
| 3,603,387 | 9/1971 | Schoeffler | 137/318 |
| 3,650,547 | 3/1972 | Tickett | 137/318 |
| 3,687,166 | 8/1972 | Herrin | 137/318 |
| 3,703,906 | 11/1972 | Tickett | 137/318 |
| 3,735,775 | 5/1973 | Tickett | 137/318 |
| 3,773,067 | 11/1973 | Ray | 137/318 |
| 3,799,182 | 3/1974 | Long | 137/15 |
| 3,891,146 | 6/1975 | Blazek | 138/94.3 |
| 3,948,282 | 4/1976 | Yano | 137/15 |
| 3,984,282 | 10/1976 | Kleimola | 176/38 |
| 4,141,378 | 2/1979 | Wegner et al. | 137/315 |
| 4,177,827 | 12/1979 | Smith et al. | 137/318 |
| 4,370,995 | 2/1983 | Smith | 137/318 |
| 4,516,598 | 5/1985 | Stupak | 137/318 |
| 5,074,526 | 12/1991 | Ragsdale | 137/15 |

OTHER PUBLICATIONS

Service Brochure of Free Flow Tapping & Inserting Company, Inc. for field services for valve inserting and pressure tapping, published 1991.
Product Catalog of International Flow Technologies, Inc. for a gate valve referred to as a Dylan Swedge Valve, published 1995.
Product Catalog of ITT Fluid Technology Corporation for cast knife gate and special fabricated valves, published 1993.
Product Catalog of Mueller Company, pp. 21–1 and 21–2 on cut–in sleeves and valves, pp. 22–1 through 22–7 on inserting valves and equipment, and p. 25–13 on engineering information, published 1993.

*Primary Examiner*—George L. Walton
*Attorney, Agent, or Firm*—Loyal M. Hanson

[57] ABSTRACT

A method for inserting a valve in a line includes the step of providing a valve assembly having a valve body with two sections adapted to be assembled over an existing pipe and a gate adapted to cut through the pipe as the gate advances from an open position toward a closed position. The method proceeds by installing the valve assembly on the existing pipe with the gate in the open position and then moving the gate toward the closed position to thereby cut through the pipe. A rotatable-pipe-cutter version of a valve assembly constructed according to the invention includes at least one cutting tooth and the valve body is configured so that an operator can rotate the body on the existing pipe while the gate is advanced toward the closed position. A guillotine version, suited for use with pipes made of polyethylene and other sliceable materials, includes a gate with a cutting edge that slices through the pipe as the gate is advanced toward the closed position.

14 Claims, 6 Drawing Sheets

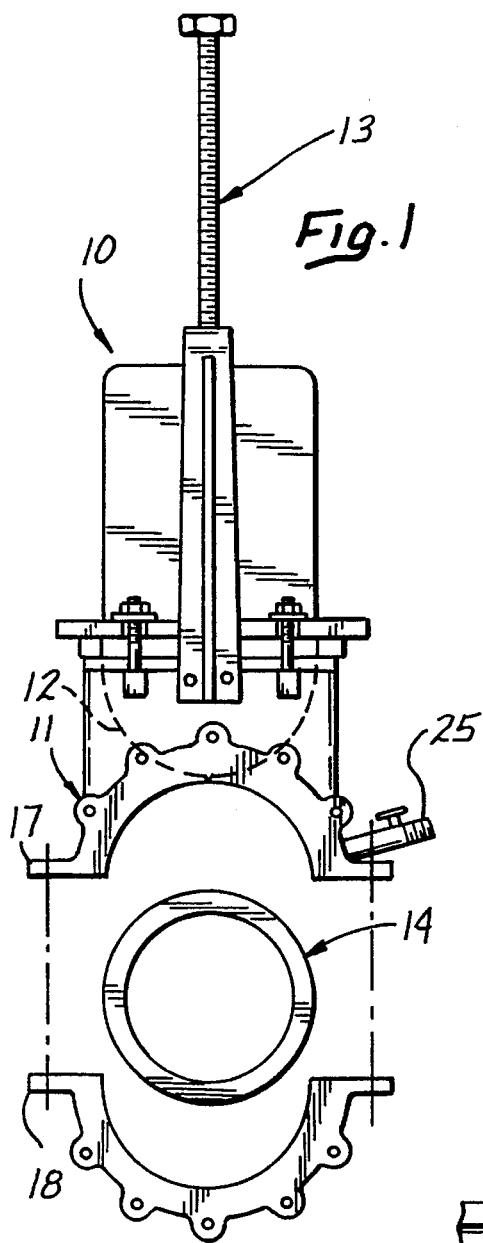
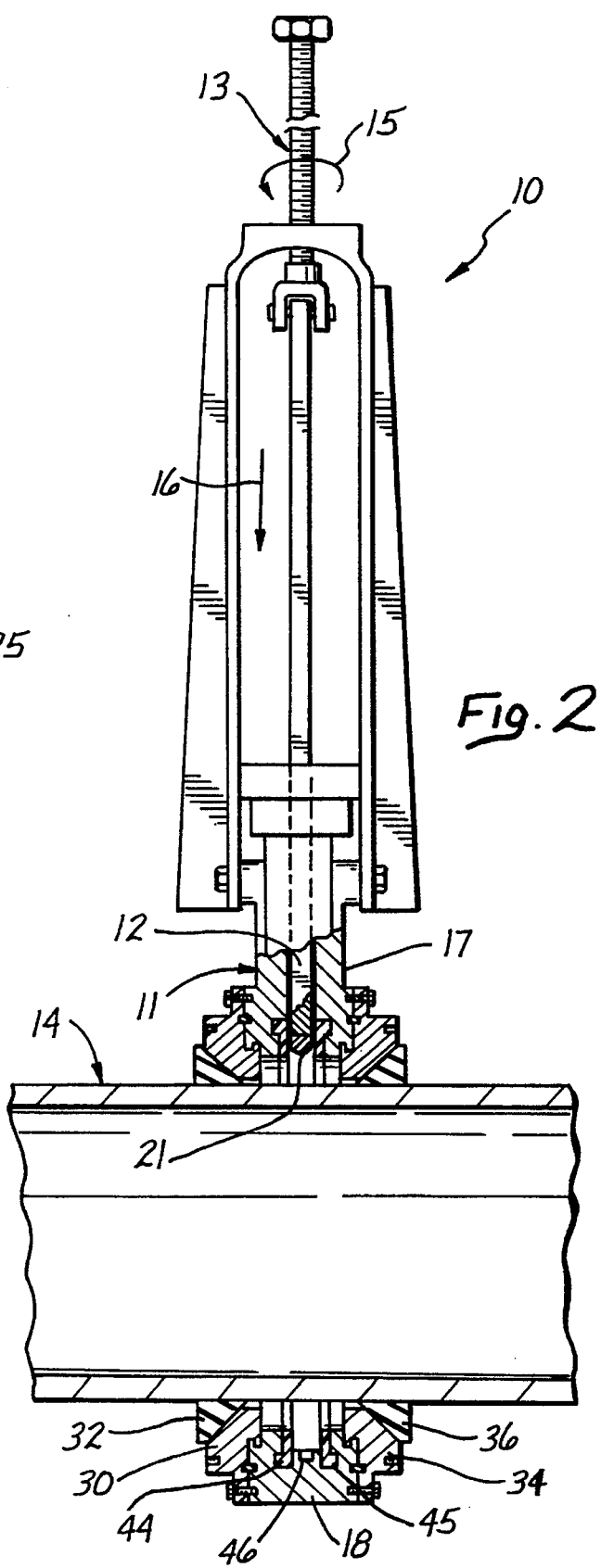

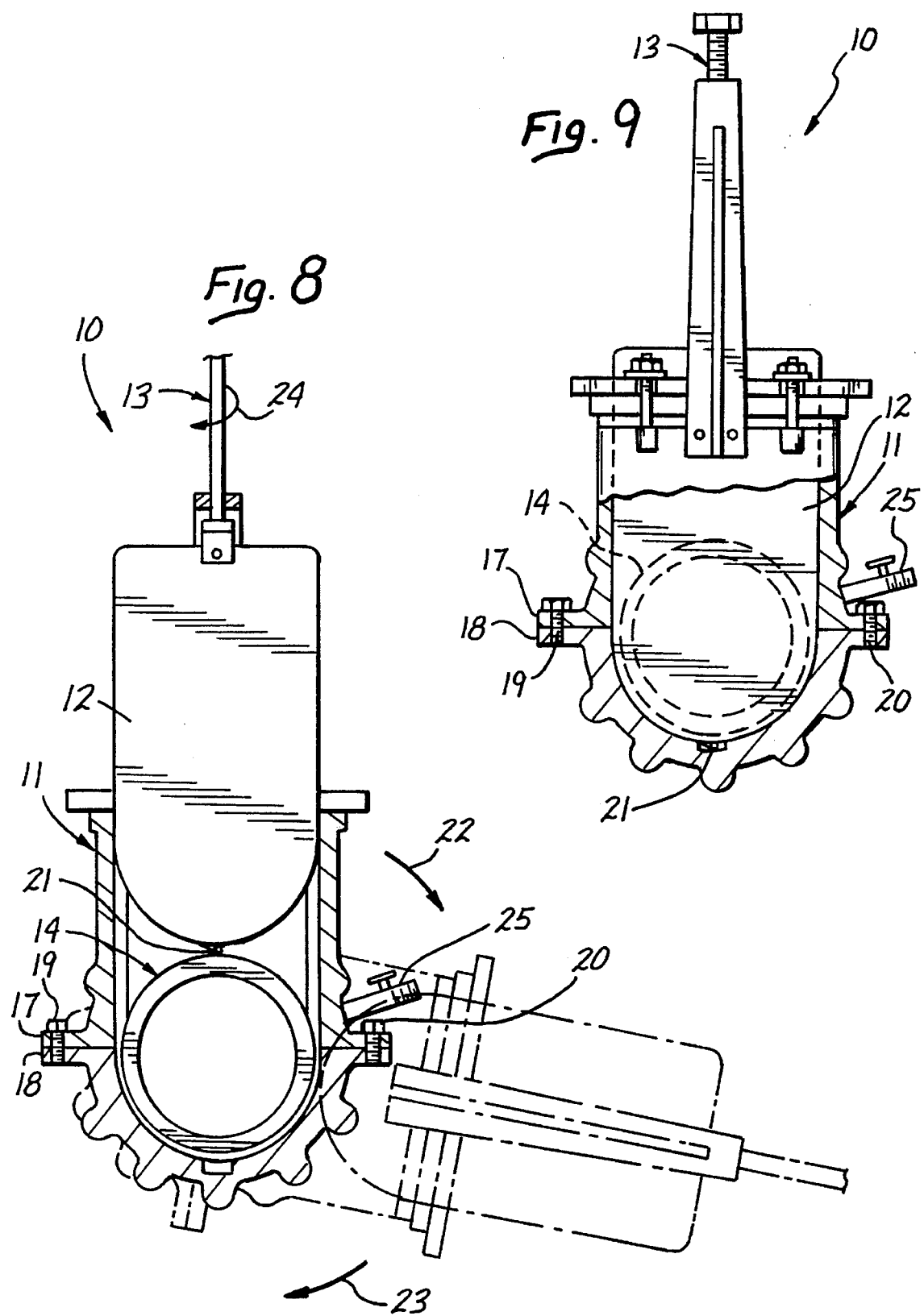

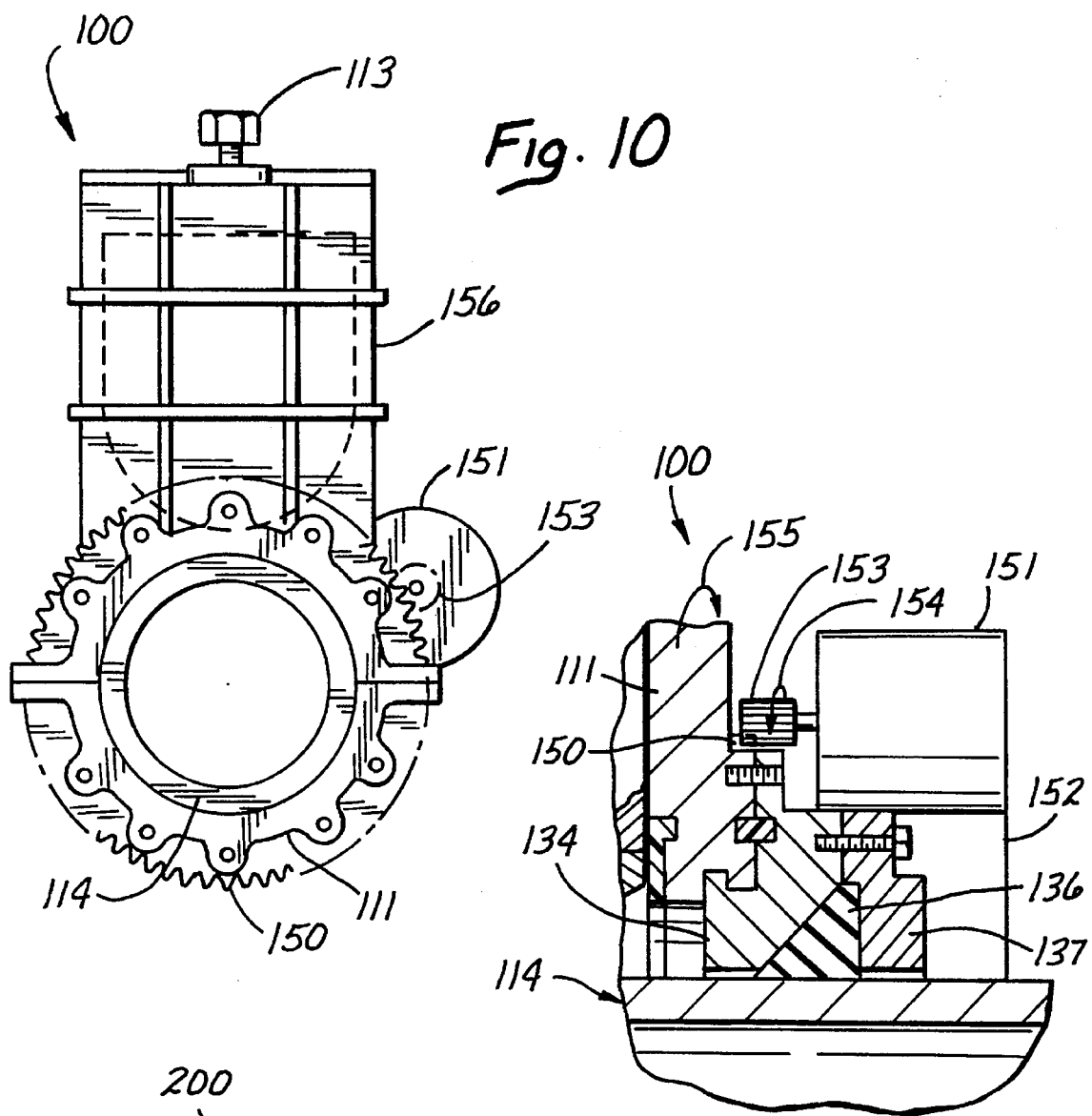
Fig. 10
Fig. 11
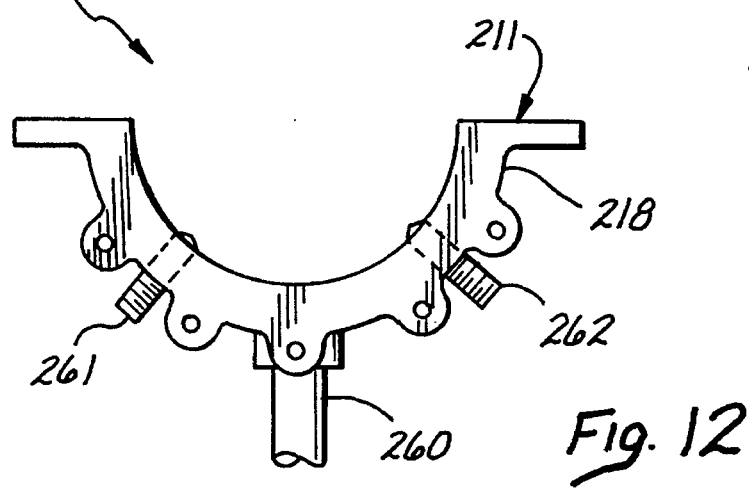
Fig. 12

VALVE INSERTION METHOD AND ASSEMBLY FOR INSERTING A VALVE IN A LINE

BACKGROUND OF THE INVENTION

1. Technical Field

This invention relates generally to procedures and equipment for stopping an existing water, sewer, or gas line containing fluid under pressure, and more particularly to a method and associated componentry for inserting a valve in a line without otherwise shutting down the line during insertion.

2. Description of Related Art

To visualize some of the problems of existing methods for valve insertion, consider the known vertical insertion technique for installing a gate valve into an existing water pipe. First, workmen install a cutter tool over the pipe at the insertion point and a jacking clamp adjacent to it. Next, they install a water-tight housing over the cutter tool. The housing includes a lower chamber that surrounds the cutter tool and an upper chamber into which the cutter is withdrawn after the pipe is cut.

With those components in place, the workmen operate the cutter to cut a section from the existing pipe. After doing that, they operate a lifting rod on the housing to raise the cutter tool and the freshly cut section into the upper chamber of the housing. Then, they operate a slide gate that seals the upper chamber from the lower chamber. With the upper chamber sealed off that way, they open the upper chamber and remove the cutter tool and section of pipe.

After removing the section of pipe, the workmen proceed to install the gate valve in its place. To do so, they first place the gate valve in the upper chamber of the housing and connect it to the lifting rod. Next, they close the upper chamber, open the slide gate, and operate the lifting rod to lower the gate valve into the position previously occupied by the removed section of pipe. With the gate valve in position, the workmen then operate the jacking clamp to seal the newly installed gate valve in place.

The foregoing description makes many problems evident. The two-chamber housing and jacking clamp components can be large, complicated, and expensive, for example, and require skill, time, and space to install. In addition, the gate valve must be specially designed for installation with the jacking clamp apparatus. Other existing techniques and componentry have similar problems. Thus, users need a better technique and associated componentry for inserting a valve in an existing line.

SUMMARY OF THE INVENTION

This invention solves the problems outlined above by providing a valve assembly designed to cut through an existing pipe. In other words, the valve assembly operates both as a cutter tool and as a valve. It has a valve body with two sections that bolt together or otherwise assemble over the pipe, and it includes a gate that cuts through the pipe as the gate is advanced from an open gate position toward a closed gate position.

Valve installation proceeds by assembling the two sections of the valve body together over the existing pipe with the gate in the open position. Then, the gate is moved toward the closed position to cut through the pipe. After installation, the gate can be opened or closed as desired. Thus, the method of this invention enables use of smaller, less complicated, and less expensive components, and installation requires less skill, time, and space.

One embodiment of a gate valve constructed according to the invention is sometimes referred to as a rotatable-pipe-cutter version. The gate includes at least one cutting tooth and the valve body is configured so that an operator can rotate the body on the existing pipe while the gate is advanced toward the closed position. As a result, the gate cuts through the existing pipe as the gate advances toward the closed position.

Another embodiment of a gate valve constructed according to the invention is sometimes referred to as a guillotine version. It is particularly suited for use with pipes made of polyethylene and other sliceable materials. The valve body need not rotate and the gate need not have a cutting tooth on the guillotine version. Instead, the gate includes a cutting edge that slices through the pipe as the gate is advanced toward the closed position.

To paraphrase some of the claim language subsequently presented, a method for inserting a valve in a line includes the step of providing a valve assembly having a valve body with two sections adapted to be assembled together over an existing pipe and a gate that has a portion adapted to cut through the pipe as the gate advances from an open position of the gate toward a closed position of the gate. The method proceeds by installing the valve assembly on the existing pipe with the gate in the open position, and then moving the gate toward the closed position to thereby cut through the pipe.

With the rotatable-pipe-cutter version, the method includes rotating the valve body on the pipe while advancing the gate toward the closed position so that at least one protrusion on the gate cuts through the pipe. With the guillotine version, the method includes advancing the gate toward the closed position while a cutting edge on the gate slices through the pipe. The following illustrative drawings and detailed description make the foregoing and other objects, features, and advantages of the invention more apparent.

BRIEF DESCRIPTION OF THE DRAWINGS

FIG. 1 of the drawings is a left side view of a first valve assembly constructed according to the invention (a rotatable-pipe-cutter version);

FIG. 2 is a front view of the first valve assembly with portions in cross section, showing the body installed over an existing pipe with bearing components bolted on both sides of the valve body and with the gate in an open position;

FIG. 8 is a side view of the first valve assembly fully installed on the pipe that shows cutting of the pipe by rotation of the valve body coupled with advancement of the gate;

FIG. 9 is another side view showing the gate in a closed position after cutting fully through the pipe;

FIG. 10 is a side view of a second valve assembly constructed according to the invention that includes a valve body outfitted with a gear sprocket to which a power driver is coupled;

FIG. 11 is an enlarged front view of a portion of the second valve assembly showing the power driver rotating the valve on the pipe;

FIG. 12 an enlarged view of a portion of a third valve assembly constructed according to the invention that includes additional cutting teeth;

DESCRIPTION OF THE PREFERRED EMBODIMENTS

Figure 3:
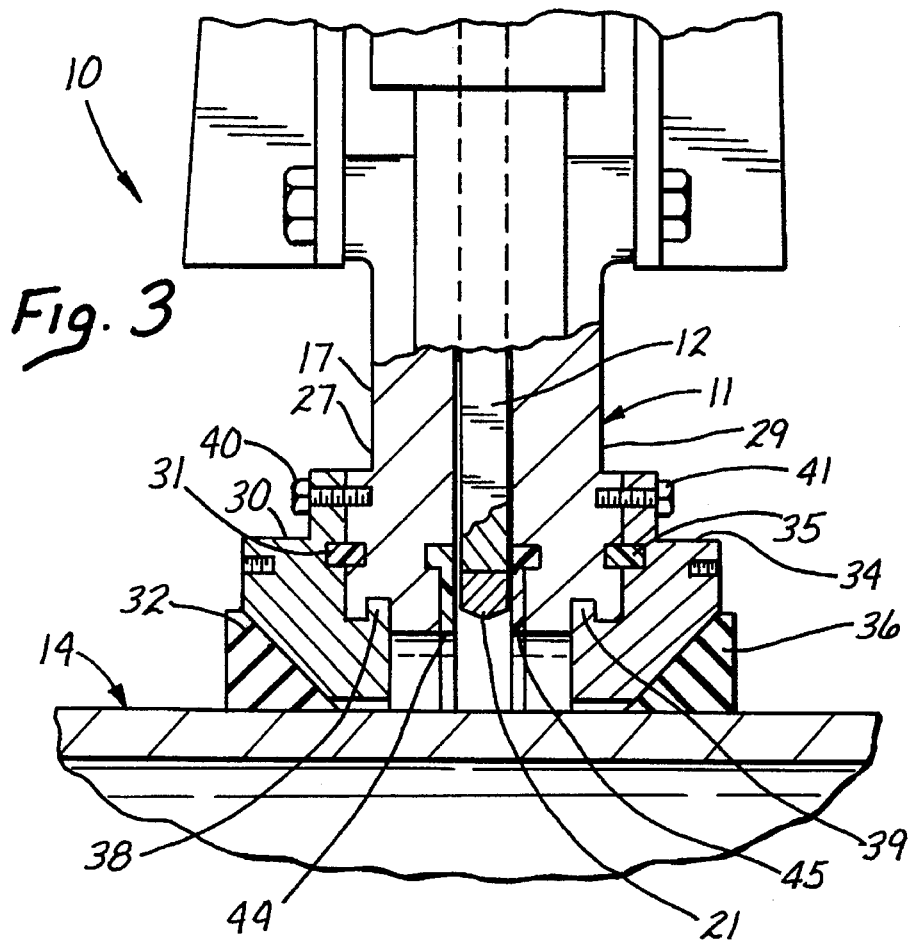
FIG. 3 is an enlarged view of a portion of FIG. 2 that shows certain sealing and rotational details of the bearing components and the sealing gaskets installed next to the bearing components.

FIGS. 1 through 9 illustrate a method of valve insertion according to the invention by reference to details of a first valve assembly 10 and associated components. The first valve assembly 10 is similar in some respects to many existing gate valves. It includes a valve body 11, a gate 12, and a gate actuating mechanism 13 (FIG. 1). The valve body 11 installs on a pipe 14 (FIGS. 1–6, 8 and 9) so that fluid flowing through the pipe 14 must pass through the valve body 11.

Rotation of the gate actuating mechanism 13 as depicted by an arrow 15 in FIG. 2 (a clockwise direction when looking down on the mechanism 13) causes the gate 12 to move as depicted by an arrow 16. The gate 12 moves from the open position shown in FIG. 2, in which the gate is withdrawn from the pipe 14, toward and to the closed position shown in FIG. 9, in which the gate 12 blocks the flow of fluid through the valve body 11. In the closed position, the gate 12 thereby blocks the flow of fluid through the pipe 14. Rotation of the gate actuating mechanism 13 in a direction opposite to that depicted by the arrow 15 causes the gate 12 to move in a direction opposite to that depicted by the arrow 16.

Thus, the first valve assembly 10 is similar in some respects to existing gate valves available from many commercial sources, including International Flow Technologies, Inc. of Murrieta, Calif., Mueller Company of Decatur, Ill., ITT Fluid Technology Corporation of Amory, Miss., and Free Flow Tapping & Inserting Company, Inc. of Naperville, Ill. It may include cast, molded, and/or machined components fabricated from known materials and according to many known techniques for installation on any of various existing pipes (e.g., twelve inch I.D. PVC-C-900 pipe). Unlike existing gate valves, however, the first valve assembly 10 includes what may be described as the combination of a split body and a pipe-cutting gate. Based upon the foregoing and subsequent descriptions, implementation of those features in a valve assembly constructed according to the invention is well within the capabilities of one of ordinary skill in the art.

To better understand what was referred to above as the combination of a split body and pipe-cutting gate, consider the first valve assembly 10 in further detail. The valve body 11 includes bolt-together first and second semicircular sections 17 and 18. They form what was referred to above as a split body, and they bolt together over the exterior of the existing pipe 14 with the pipe 14 containing water or other fluid under pressure as an initial step in installing the first valve assembly 10. FIGS. 2–6, 8 and 9 illustrate the two sections 17 and 18 assembled over the pipe 14 that way, with two bolts 19 and 20 being visible in FIGS. 8 and 9.

Figures 13, 14:
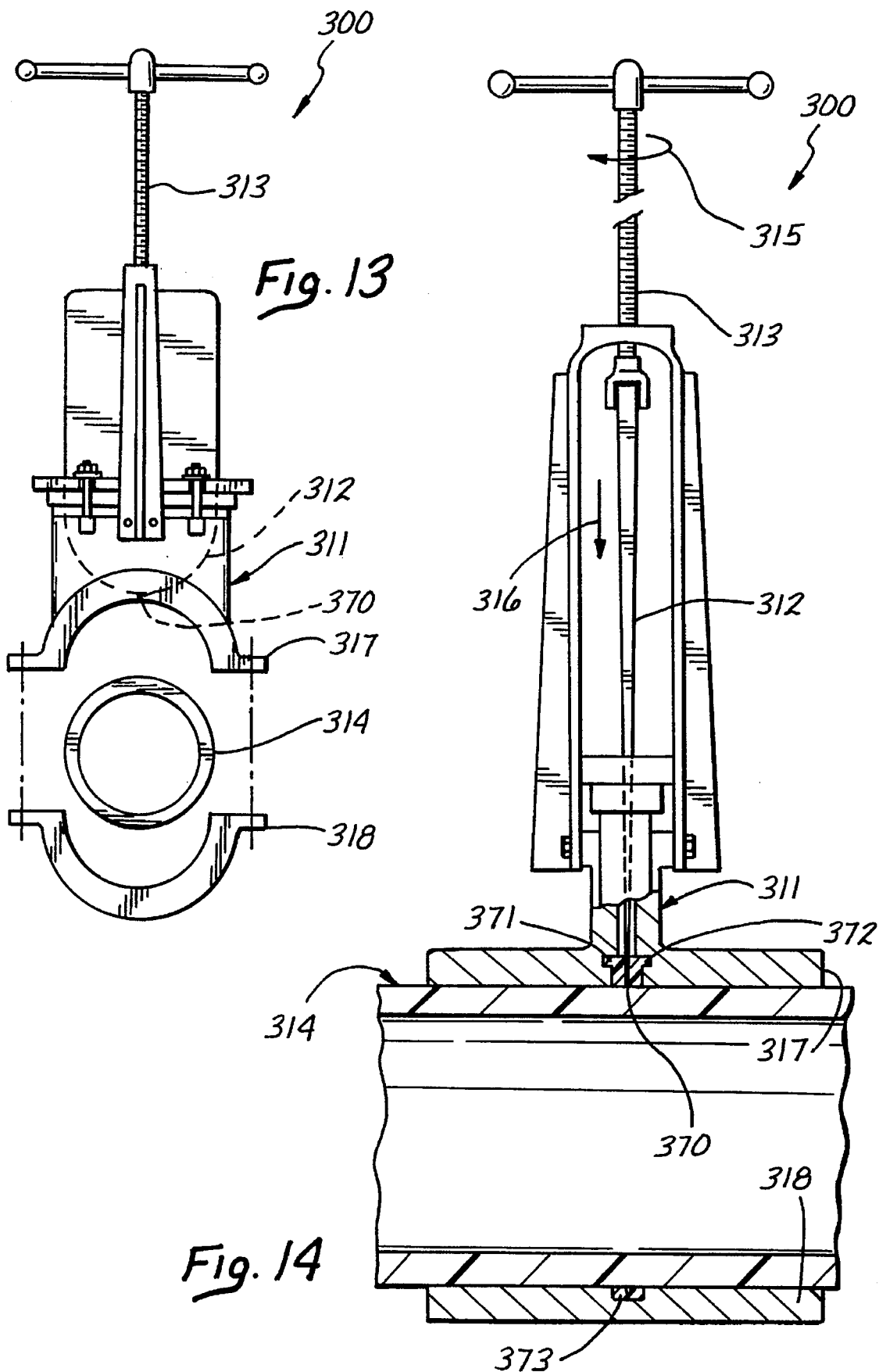
FIG. 13 is a side view of a fourth valve assembly constructed according to the invention (a guillotine version)
FIG. 14 is a front view of the fourth valve assembly shown installed over an existing pipe with the gate in an open position before it slices through the pipe.

The gate 12 (e.g., a ¼-inch thick, ⅜-inch thick, or even thicker stainless steel component) includes a distal portion disposed toward the section 18 of the valve body 11 that is adapted to cut through the pipe 14 as the gate 12 advances from the open position toward the closed position. So, the gate 12 forms what was referred to above as a pipe-cutting gate. One form of pipe-cutting gate subsequently described with reference to a guillotine version of the invention that is illustrated in FIGS. 13 and 14, includes a cutting edge adapted to slice through an existing pipe composed of a sliceable material. However, the gate 12 of the first valve assembly 10 includes at least one protrusion or cutting tooth 21 (FIGS. 2–4 and 6–9) adapted to cut through the wall of pipes composed of harder material.

The tooth 21 is formed from a suitably hard material (e.g., carbide steel) so that it cuts through the wall of the pipe 14 as the gate 12 is advanced toward the closed position and the valve body 11 is rotated on the pipe 14 (i.e., about a central longitudal axis of the pipe 14). That cutting action may remind one of a rotatable pipe cutter, and that is why the valve assembly 10 is sometimes referred to as a rotatable-pipe-cutting version of the invention. The tooth 21 may be integrally formed with the gate 12 in one-piece construction, or it may be attached by suitable means. The tooth 21 is wide enough to cut a sufficiently wide path through the pipe 14 to accommodate the thickness of the gate 12. Additional teeth may also be provided on the gate 12 (not shown).

The valve body 11 of the first valve assembly 10 does not fit tightly over the pipe 14. It fits loosely. It is dimensioned to fit loosely enough so that the valve body 11 can be rotated on the cylindrically shaped outer surface of the pipe 14 about a central longitudinal axis of the pipe 14 as the gate 12 is advanced toward the closed position. Bearing and sealing components subsequently described serve the function of rotatably mounting the valve body 11 on the pipe 14 while providing a seal between the valve body 11 and the pipe 14.

After installing the first valve assembly 10 on the existing pipe 14 with the bearing and sealing components, the installer rotates the valve body 11 on the pipe 14 (as depicted by arrows 22 and 23 in FIG. 8) while occasionally operating the gate actuating mechanism 13 as depicted by an arrow 24 in order to move the gate 12 toward the closed position. That combined action results in the tooth 21 (and any additional teeth) on the gate 12 cutting through the pipe 14.

As the tooth 21 first cuts through the pipe 14, the installer may open a flush port 25 (FIGS. 1, 8, and 9) to allow fluid from the pipe 14 to flush away any particles that were produce as the tooth 21 cut through the pipe 14. The flush port 25 is then closed. Once the tooth 21 has cut fully through the wall of the pipe 14, the gate 12 may be moved to the fully closed position shown in FIG. 9 to turn off the flow of fluid through the pipe 14. The gate 12 may also be moved to the fully open position shown in FIG. 2 to turn on the flow of fluid through the pipe 14, and it may be moved to any desired position between the fully closed and fully open positions to control fluid flow accordingly.

Figure 4:
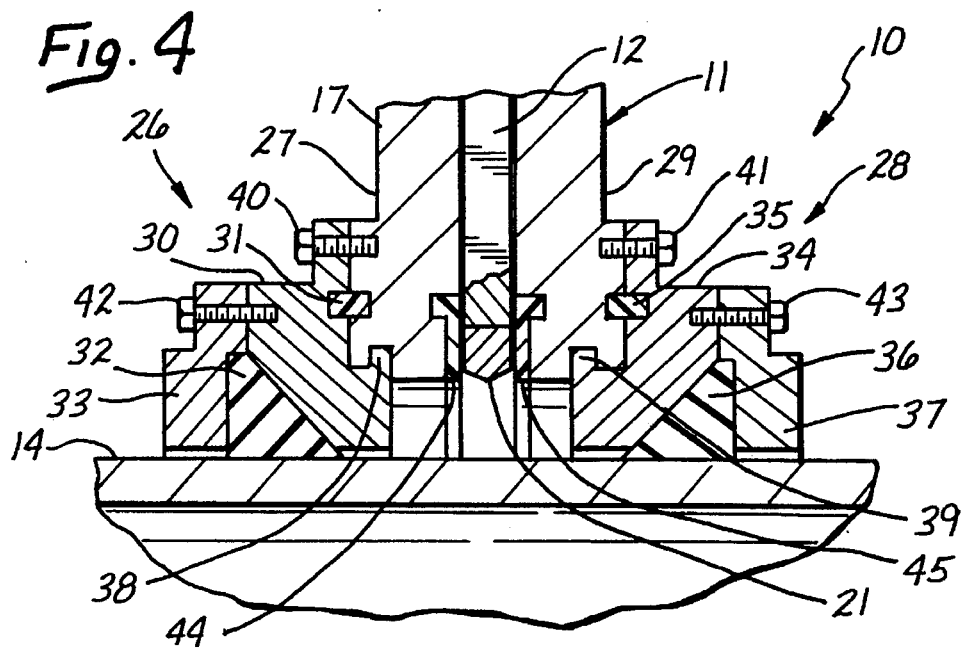
FIG. 4 is an enlarged view similar to FIG. 3 that shows sealing collars installed next to the sealing gaskets.
Figure 5:
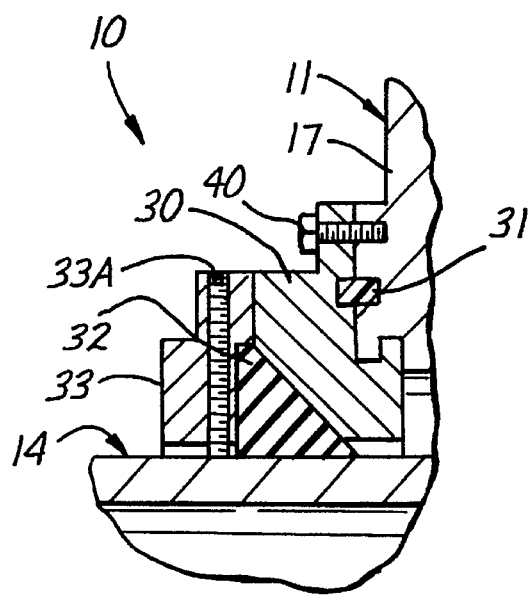
FIG. 5 is an enlarged view similar to FIG. 4 that shows details of a setscrew through one of the sealing collars.

From the foregoing description, one of ordinary skill in the art can construct suitable bearing and sealing components for a valve assembly constructed according to the invention. By way of example, the bearing and sealing components that rotatably mount the illustrated valve body 11 on the pipe 14 while providing a seal between the valve body 11 and the pipe 14, include a first bearing/sealing assembly 26 on a first side 27 of the valve body 11 and a second bearing/sealing assembly 28 on a second side 29 of the valve body 11 (FIGS. 2–4).

The first bearing/sealing assembly 26 includes a first bearing component 30 having two parts or halves that can be bolted together over the pipe 14, similar to the way the two sections 17 and 18 of the valve body 11 can be bolted together over the pipe 14. The first bearing component 30 helps mount the valve body 11 on the pipe 14. It also allows rotation of the valve body 11 on the pipe 14 while retaining pressure against a first sealing ring 31 that provides a seal between the first side 27 of the valve body 11 and the first bearing component 30.

The first sealing ring 31 may be composed of nylon, brass, or other suitable sealing material. It is split so that it can be installed over the pipe 14. When bolted to the valve body 11, the first bearing component 30 forces a split in the first sealing ring 31 back together.

The first bearing/sealing assembly 26 also includes a split and tapered first gasket 32 (e.g., a commercially available sealing component composed of rubber or other suitable material), and it includes a first sealing collar 33 (sometimes referred to in the related art as a "gland") that cooperates with the first gasket 32 to provide a permanent seal between the first bearing component 30 and the pipe 14. The first sealing collar 33 also has two parts or halves that can be bolted together over the pipe 14, and it bolts to the first bearing component 33 during assembly as subsequently described to force a split in the first gasket 32 back together while wedging the first gasket 22 between the pipe 14 and the first bearing component 30.

Similarly, the second bearing/sealing assembly 28 includes a second bearing component 34 that helps mount the valve body 11 on the pipe 14 while permitting the valve body 11 to rotate on the pipe 14, a second sealing ring 35 that provides a seal between the second side 29 of the valve body 11 and the second bearing component 34, and a second gasket 36 that cooperates with a second sealing collar 37 to provide a seal between the second bearing component 34 and the pipe 14. The first and second bearing components 30 and 34 may be fabricated from steel or other suitably rigid material and they include annular flanges 38 and 39 (FIGS. 3 and 4) that interlock with the valve body 11 and provide a structure or track that upon which the valve body 11 rides as the valve body 11 rotates, while keeping the assembly together if forces tend to shift the pipe 14 after the gate 12 cuts through it. The first and second sealing rings 31 and 35 are held securely in position by bolting the first and second bearing components 30 and 34 to the valve body 11, as illustrated by two bolts 40 and 41 in FIGS. 3–6. Additional bolts are provided, but they are not visible in the drawings.

The first and second bearing components 30 and 34 are bolted to the valve body 11, with the first and second sealing rings 31 and 35 in place, after the valve body 11 is assembled over the pipe 14. Next, the first and second gaskets 32 and 36 are placed over the pipe 14 next to the first and second bearing components 30 and 34. Then, the first and second sealing collars 33 and 37 are installed loosely on the pipe 14.

The first and second sealing collars 33 and 37 are then bolted to respective ones of the first and second bearing components 30 and 34. That wedges each of the first and second rubber gaskets 32 and 36 between the pipe 14 and a respective one of the first and second bearing components 30 and 34. After the first and second sealing collars are bolted to the first and second bearing components, bolts holding the two halves of the first and second sealing collars 33 and 37 together are tightened to tighten the collars on the pipe 14 and complete the seal.

The first and second gaskets 32 and 36 may be commercially available split and tapered rubber rings, and the first and second sealing collars 33 and 37 may be suitably configured steel components. Each of the gaskets 32 and 36 is forced between the pipe 14 and a respective one of the first and second bearing components 30 and 34 by bolting the first and second sealing collars 33 and 37 to the first and second bearing components 30 and 34 as illustrated by two bolts 42 and 43 in FIGS. 4 and 6. Additional bolts are provided for that purpose, but only two are visible in the drawings.

Figure 6:
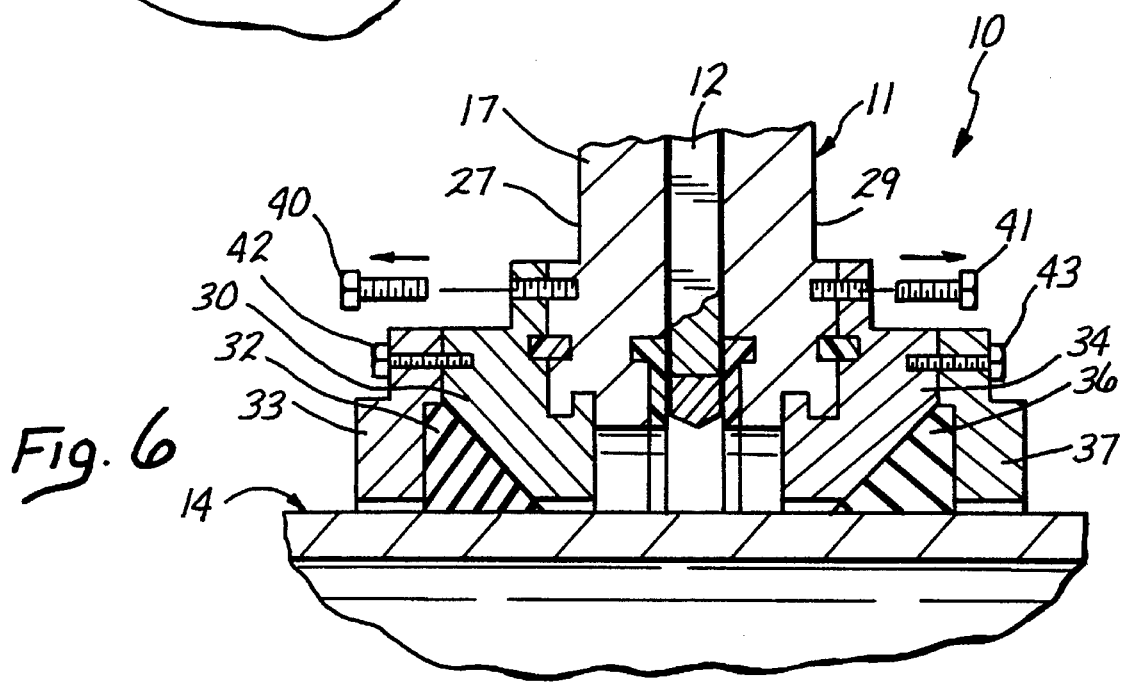
FIG. 6 is an enlarged view similar to FIG. 4 that shows disconnection of the bearing components to allow rotation of the valve body on the pipe.
Figure 7:
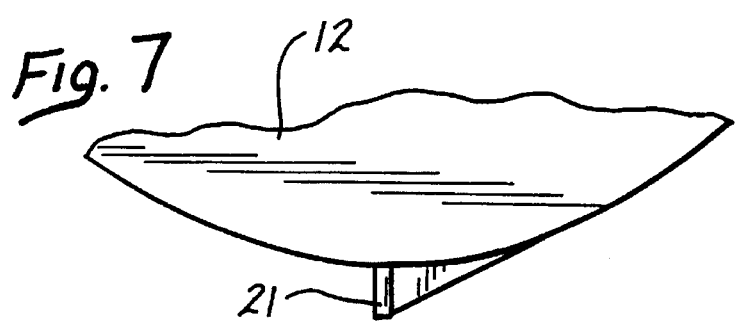
FIG. 7 is an enlarged right side view of a portion of the gate that shows further details of the cutting tooth.

Once the first and second sealing collars 33 and 37 are bolted to the first and second bearing components 30 and 40, and the sealing collars 33 and 37 are tightened on the pipe 14, the whole assembly is pressure tested by coupling a source of pressurized fluid to the flush port 25. Then, the first and second bearing components 30 and 34 are unbolted from the valve body 11, including removal of the bolts 40 and 41 as depicted in FIG. 6. That rotationally frees the valve body 11 from the first and second bearing components 30 and 34 so that the valve body 11 may be rotated on the pipe 11 as the tooth 21 on the gate 12 (and any additional teeth on the gate) cuts through the pipe 14. After the tooth 21 cuts through the pipe 14, the first and second bearing components are re-bolted to the valve body 11 (including reinstallation of the first and second bolts 40 and 41) to secure the valve body 11 against further rotation.

Sealing between the gate 12 and the valve body 11 is provided by first and second gate sealing rings 44 and 45 (FIGS. 2–4, and 6). They may be composed of the material commercially available under the trademark TEFLON, or other suitable material. They may include semicircular halves that fit in suitable annular channels in the first and second sections 17 and 18 of the valve body 11 that are provided for that purpose. A recess 46 in the second section 18 of the valve body 11 (FIG. 2) receives the tooth 21 when the gate 12 is in the closed position. Suitable means, such as a set screw 33A that is visible in FIG. 5, stops the sealing collar 33 from rotating on the pipe 14. The set screw may include a serrated foot pad that grips the pipe 14, and the second sealing collar 37 may include a similar set screw (not shown).

Rotation of the valve body 11 may be accomplished manually by grasping the gate actuating mechanism 13 or part of the valve body 11, and then rotating the valve assembly 10 in full circles about the pipe 14. Instead of manually rotating the valve body 11 of the first valve assembly 10, the installer may elect, instead, to use the second valve assembly 100 shown in FIGS. 10 and 11. The second valve assembly 100 is similar in many respects to the first valve assembly 10, and so only differences are discussed in further detail. For convenience, numerals designating parts of the second valve assembly 100 are increased by one hundred over those designating corresponding parts of the first valve assembly 10.

One difference is that the second valve assembly 100 includes a valve body 111 that forms a sprocket 150 (FIGS. 10 and 11), and it includes a drive component 151 mounted on the pipe 114 by suitable structure 152 (FIG. 11). A gear 153 on the drive component 151 engages the sprocket 150. Operation of the drive component 151 causes the gear 153 to rotate as depicted by an arrow 154 in FIG. 11. That motion is coupled to the sprocket 150 to rotate the valve body 111 on the pipe 114 as depicted by an arrow 155.

The drive component 151 may take any of various known forms, including any of various electric, pneumatic, and hydraulic motors. It may even take the form of a manually driven ratchet that the installer operates by pumping a rachet handle on drive component 151 (not shown). It is intended that the drive component 151 illustrate all such variations.

The drive component 151 may be configured to alternate rotational directions. In other words, it may be configured to drive the valve body 111 in the direction of the arrow 155 from a starting point through an arc of predetermined size less than a full circle, then reverse direction until the valve body 111 returns to the starting point, and then repeat the foregoing back-and-forth motion. The installer need not rotate the valve body 111 in a full circle, and the sprocket 150 can extend in an arc less than a full circle. That feature can be helpful in situations where insufficient space exists around the pipe 114 for rotation in a full circle.

The second valve assembly 100 includes a bonnet 156 (FIG. 10) and a gate actuating mechanism 113 that combine to give the second valve assembly a smaller profile than the first valve assembly 10. The smaller profile also helps in tight installations where limited space exists around the pipe 114, and it is useful for direct burial service.

FIG. 12 shows a portion of a third valve assembly 200 constructed according to the invention. The third valve assembly 200 is also similar in many respects to the first valve assembly 10, and so only differences are described in further detail. For convenience, reference numerals designating parts of the third valve assembly 200 are increased by two hundred over those designating corresponding parts of the first valve assembly 10.

One difference is that the valve body 211 includes a handle member 260 that removable mounts on the second section 218 of the valve body 211 temporarily. The installer grasps the handle member 260 in order to rotate the valve body 211. He removes the handle member 260 after installation is complete.

Another difference is that the third valve assembly 200 includes additional cutting teeth 261 and 262 (e.g., carbide steel). They are radially adjustable so that they can be advanced occasionally for pipe-cutting purposes as the valve body 211 is rotated. They are partially withdrawn after installation of the third valve assembly 200 is complete. For that purpose, the teeth 261 and 262 may take the form of exteriorly threaded members that screw into interiorly threaded holes in the second section 218. They may, for example, include heads adapted to receive a conventional Allen wrench.

FIGS. 13 and 14 show a fourth valve assembly 300 constructed according to the invention. The fourth valve assembly 300 is similar in some respects to the first valve assembly 10, and so only differences are described in further detail. For convenience, reference numerals designating parts of the fourth valve assembly 300 are increased by three hundred over those designating corresponding parts of the first valve assembly 10.

One difference is that the gate 312 includes a cutting edge 370 that is adapted to slice through the pipe 314 as the gate 312 is advanced toward the closed position. Thus, the valve body 311 need not be rotated on the pipe 314 and bearing/sealing assemblies or similar rotational components are not needed. Of course, the fourth valve assembly 300 is particularly suited for use with pipes made of polyethylene and other sliceable materials, and the pipe 314 is intended to depict such a sliceable pipe.

The illustrated first and second sections 317 and 318 of the valve body 311 bolt together or otherwise assemble together over the pipe 314 tightly so that they grip the pipe 314. Although not used in the illustrated embodiment, sealing gaskets and sealing collars can be employed also, similar to those used with the first valve assembly 10. Fusing (e.g., known pipe fusing techniques for plastic pipe) or other suitable bonding technique may be used to produce a bond between the valve body 317 and the pipe 314 during assembly to connect the valve body to the pipe and enhance the grip. The illustrated gate 312 is a stainless steel member that narrows in thickness from approximately ¼ inch to the knife-like cutting edge 370. A straight cutting edge may be employed instead of the rounded cutting edge 370 illustrated. Seals 371, 372, and 373 are suitable sealing members that provide a seal between the gate 312. In addition, the fourth valve assembly 300 may be configured with a bonnet, similar to the second valve assembly 100 in FIG. 10.

Recapitulating the methodology employed, a method of inserting a valve in a line includes the step of providing a valve assembly having a valve body that includes two sections adapted to be assembled together over an existing pipe and a gate that includes a portion adapted to cut through the pipe as the gate is advanced from an open position of the gate to a closed position of the gate. The method proceeds by installing the valve assembly on the existing pipe with the gate in the open position, and then moving the gate to the closed position to thereby cut through the pipe. The valve assembly may be a rotatable-pipe-cutter version with the method including rotation of the body coupled with advancement of the gate, or the valve assembly may be a guillotine version with the method including slicing through the pipe as the gate is advanced toward the closed position.

Either way, the valve assembly operates both as a cutter tool and as a valve. Thus, the method of this invention enables use of smaller, less complicated, and less expensive components, and installation requires less skill, time, and space. Although exemplary embodiments have been shown and described, one of ordinary skill in the art may make many changes, modifications, and substitutions without necessarily departing from the spirit and scope of the invention.

What is claimed is:

1. A method for inserting a valve in a line, comprising:

providing a valve assembly having a valve body that includes two sections adapted to be assembled together over an existing pipe and a gate that includes a portion adapted to cut through the pipe as the gate is advanced from an open position of the gate to a closed position of the gate;

installing the valve assembly on the existing pipe with the gate in the open position; and moving the gate to the closed position to thereby cut through the pipe;

wherein the valve body is adapted to be rotated on the pipe as the gate is advanced to the closed position;

wherein the gate includes at least one protrusion adapted to cut through the pipe as the gate is advanced toward the closed position while the valve body is rotated on the pipe; and wherein the step of moving the gate toward the closed position includes rotating the valve body on the pipe while advancing the gate toward the closed position so that the protrusion cuts through the pipe.

2. A method as recited in claim 1, wherein the step of moving the gate toward the closed position includes rotating the valve body in a full circle on the pipe.

3. A valve assembly for insertion in a line, the valve assembly comprising:

a valve body having two sections adapted to assemble together over an existing pipe; and a gate having a portion adapted to cut through the pipe as the gate advances from an open position of the gate to a closed position of the gate;

the valve body being adapted to be rotated on the pipe as the gate is advanced toward the closed position; and the gate including at least one protrusion adapted to cut through the pipe as the gate is advanced toward the closed position while the valve body is rotated on the pipe.

4. A valve assembly as recited in claim 3, further comprising means for rotatably mounting the valve body on the pipe while providing a seal between the valve body and the pipe, said means including:

a first assembly adapted to provide a first bearing component on a first side of the valve body, a seal between the first side of the valve body and the first bearing component, and a seal between the first bearing component and the pipe; and a second assembly adapted to provide a second bearing component on a second side of the valve body, a seal between the second side of the valve body and the second bearing component, and a seal between the second bearing component and the pipe.

5. A valve assembly as recited in claim 4, wherein:

the first assembly includes a first gasket and a first sealing collar, which first sealing collar bolts to the first bearing component and cooperates with the first gasket to provide the seal between the first bearing component and the pipe; and the second assembly includes a second gasket and a second sealing collar, which second sealing collar bolts to the second bearing component and cooperates with the second gasket to provide the seal between the second bearing component and the pipe.

6. A valve assembly as recited in claim 4, wherein the first and second bearing components are adapted to be bolted to the valve body after the valve assembly is installed on the existing pipe.

7. A valve assembly as recited in claim 3, wherein the valve body includes a port for use in flushing away particles produced in cutting through the pipe.

8. A valve assembly as recited in claim 3, further comprising means for facilitating manual rotation of the valve body on the pipe, including a handle member adapted to be connected to the valve body.

9. A valve assembly as recited in claim 3, further comprising means for rotating the valve body, including a sprocket arrangement on the valve body and a driver apparatus mounted on the pipe, which driver apparatus is adapted to engage the sprocket and rotate the valve body.

10. A valve assembly as recited in claim 3, further comprising means in the form of at least one adjustable cutting tooth on the valve body for cutting the pipe while the valve body is rotated on the pipe.

11. A valve assembly as recited in claim 3, wherein the valve body is adapted to be rotated in a full circle on the pipe as the gate is advanced toward the closed position.

12. A valve assembly for insertion in a line, the valve assembly comprising:

a valve body having two sections adapted to be assembled together over an existing pipe to form an assembled valve body;

a gate mounted on the valve body for movement between open and closed positions of the gate;

means for providing a seal between the assembled valve body and the pipe while enabling rotation of the gate and the assembled valve body on the pipe together as the gate is advanced toward the closed position; and means for cutting the pipe as the gate and the assembled valve body are rotated on the pipe together in order to produce a path through the pipe while at the same time rotating the gate with the assembled valve body as the gate travels through the path in the pipe to the closed position;

wherein the means for cutting the pipe includes at least one member on the assembled valve body that is adapted to be advanced radially toward the pipe and cut the pipe as the gate and the assembled valve body are rotated on the pipe together and the gate is advanced to the closed position.

13. A valve assembly as recited in claim 12, wherein the means for providing a seal between the assembled valve body and the pipe while enabling rotation of the assembled valve body on the pipe is configured to enable rotation of the assembled valve body in full circles on the pipe.

14. A valve assembly as recited in claim 12, wherein the means for cutting the pipe includes at least one protrusion on the gate that is adapted to cut the pipe.

* * * * *